(12) United States Patent
Guetter et al.

(10) Patent No.: US 12,461,077 B2
(45) Date of Patent: Nov. 4, 2025

(54) COMPUTER-IMPLEMENTED METHOD FOR IDENTIFYING AT LEAST ONE PEAK IN A MASS SPECTROMETRY RESPONSE CURVE

(71) Applicants: Ventana Medical Systems, Inc., Tucson, AZ (US); Roche Diagnostics Operations, Inc., Indianapolis, IN (US)

(72) Inventors: Christoph Guetter, Alameda, CA (US); Kirill Tarasov, Tutzing (DE); Andreas Reichert, Peissenberg (DE); Raghavan Venugopal, Fremont, CA (US); Daniel Russakoff, San Francisco, CA (US)

(73) Assignees: Roche Diagnostics Operations, Inc., Indianapolis, IN (US); Ventana Medical Systems, Inc., Tucson, AZ (US)

( * ) Notice: Subject to any disclaimer, the term of this patent is extended or adjusted under 35 U.S.C. 154(b) by 270 days.

(21) Appl. No.: 17/931,691

(22) Filed: Sep. 13, 2022

(65) Prior Publication Data

US 2023/0003697 A1     Jan. 5, 2023

Related U.S. Application Data

(63) Continuation of application No. PCT/EP2021/057935, filed on Mar. 26, 2021.

(30) Foreign Application Priority Data

Mar. 27, 2020   (EP) .................................... 20166187

(51) Int. Cl.
*G01N 30/86* (2006.01)
*G06N 3/048* (2023.01)
*G06N 3/063* (2023.01)

(52) U.S. Cl.
CPC ...... *G01N 30/8631* (2013.01); *G01N 30/8644* (2013.01); *G01N 30/8693* (2013.01); *G06N 3/048* (2023.01); *G06N 3/063* (2013.01)

(58) Field of Classification Search
CPC ........... G01N 30/8631; G01N 30/8644; G01N 30/8693; G06N 3/048; G06N 3/063; G06N 3/045; G06N 3/08
See application file for complete search history.

(56) References Cited

U.S. PATENT DOCUMENTS

| | | | |
|---|---|---|---|
| 7,219,038 B2 | 5/2007 | Tracy et al. | |
| 7,720,612 B2 | 5/2010 | Izmailov et al. | |

(Continued)

FOREIGN PATENT DOCUMENTS

| | | |
|---|---|---|
| CN | 110838340 A | 2/2020 |
| CN | 110895799 A | 3/2020 |

(Continued)

OTHER PUBLICATIONS

International Search Report issued Jun. 23, 2021, in Application No. PCT/EP2021/057935, 3 pp.

(Continued)

*Primary Examiner* — Manuel A Rivera Vargas
(74) *Attorney, Agent, or Firm* — Taft Stettinius & Hollister LLP (57) ABSTRACT

A computer implemented method for identifying at least one peak in a mass spectrometry response curve is provided comprising: a) providing at least one mass spectrometry response curve by using at least one mass spectrometry device; b) evaluating the mass spectrometry response curve by using at least one trained model thereby identifying a start point and an end point of at least one peak of the mass spectrometry response curve, wherein the model was trained using a deep learning regression architecture.

11 Claims, 4 Drawing Sheets

(56) References Cited

U.S. PATENT DOCUMENTS

| | | |
|---|---|---|
| 8,428,889 B2 | 4/2013 | Wright |
| 2008/0025591 A1* | 1/2008 | Bhanot ............... G06F 18/40 382/224 |
| 2012/0089344 A1 | 4/2012 | Wright |
| 2017/0083796 A1 | 3/2017 | Kim et al. |
| 2019/0018019 A1 | 1/2019 | Shan et al. |
| 2020/0279408 A1* | 9/2020 | Osoekawa ............. G01N 30/86 |
| 2023/0029474 A1* | 2/2023 | Wade ..................... G16C 20/70 |

FOREIGN PATENT DOCUMENTS

| | | |
|---|---|---|
| EP | 0395481 A2 | 10/1990 |
| EP | 3425369 A1 | 1/2019 |
| EP | 3467493 A1 | 4/2019 |
| JP | 2019-086475 A | 6/2019 |
| WO | 2012/047417 A1 | 4/2012 |
| WO | 2019/092836 A1 | 5/2019 |
| WO | 2020/191857 A1 | 10/2020 |

OTHER PUBLICATIONS

Mendez, Kevin M. et al., The application of artificial neural networks in metabolomics: a historical perspective, Metabolomics, 2019, 14 pp., vol. 15, No. 142.

Risum, Anne Bech and Bro, Rasmus, Using deep learning to evaluate peaks in chromatographic data, Talanta, 2019, pp. 255-260, vol. 204.

Chinese Office Action; China National Intellectual Property Administration; Chinese Patent Application No. 202180024754.9; Mar. 29, 2024; 17 pages.

Written Opinion of the International Searching Authority, European Patent Office, International Patent Application No. PCT/EP2021/057935, Sep. 30, 2021, 6 pages.

International Preliminary Report on Patentability, The International Bureau of WIPO, International Patent Application No. PCT/EP2021/057935, Oct. 6, 2022, 7 pages.

* cited by examiner

Fig. 6 C

COMPUTER-IMPLEMENTED METHOD FOR IDENTIFYING AT LEAST ONE PEAK IN A MASS SPECTROMETRY RESPONSE CURVE

CROSS-REFERENCE TO RELATED APPLICATIONS

This application is a continuation of International Patent Application No. PCT/EP2021/057935, filed 26 Mar. 2021, which claims priority to European Patent Application No. 20166187.3, file 27 Mar. 2020, the disclosures of which are hereby incorporated by reference in their entirety.

TECHNICAL FIELD

The present disclosure relates to a computer implemented method for identifying at least one peak in a mass spectrometry response curve and a device for monitoring at least one analyte in a sample. The proposed methods and devices can be used in the technical field of mass spectrometry, specifically for liquid chromatography-mass spectrometry.

BACKGROUND

Current Liquid Chromatography-Mass Spectrometry (LC-MS) data processing usually requires manual data review of all acquired data and subsequent manual correction of about 5-20% of the results due to high error rates. It is performed by trained LC-MS operators through tedious visual analysis of hundreds of chromatography plots.

Known methods and devices only inform if a peak is present or not. A reliable determination of the area under the peak is, however, not ensured.

It is therefore desirable to provide a computer implemented method for identifying at least one peak in a mass spectrometry response curve and a device for monitoring at least one analyte in a sample which address the above-mentioned technical challenges.

SUMMARY

Although the embodiments of the present disclosure are not limited to specific advantages or functionality, it is noted that in accordance with the present disclosure a method for identifying at least one peak in a mass spectrometry response curve and a device for monitoring at least one analyte in a sample are described that provide for reliable and automatic determination of peak area of an analyte peak in a chromatogram.

In accordance with one embodiment of the disclosure, a computer implemented method for identifying at least one peak in a mass spectrometry response curve is provided comprising: providing at least one mass spectrometry response curve by using at least one mass spectrometry device; evaluating the mass spectrometry response curve by using at least one trained model thereby identifying a start point and an end point of at least one peak of the mass spectrometry response curve, wherein the model was trained using a deep learning regression architecture.

In accordance with another embodiment of the disclosure, a device for monitoring at least one analyte in a sample is provided comprising: at least one mass spectrometry device configured for providing at least one mass spectrometry response curve; at least one evaluation device configured for evaluating the mass spectrometry response curve by using at least one trained model thereby identifying a start point and an end point of at least one peak of the mass spectrometry response curve, wherein the model was trained using a deep learning regression architecture.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "typically", "more typically", "particularly", "more particularly", "specifically", "more specifically" or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an embodiment of the disclosure" or similar expressions are intended to be optional features, without any restriction regarding alternative embodiments of the disclosure, without any restrictions regarding the scope of the disclosure and without any restriction regarding the possibility of combining the features introduced in such way with other optional or non-optional features of the disclosure.

In a first aspect of the present disclosure, a computer implemented method for identifying at least one peak in a mass spectrometry response curve is disclosed.

The term "computer implemented method" as used herein is a broad term and is to be given its ordinary and customary meaning to a person of ordinary skill in the art and is not to be limited to a special or customized meaning. The term specifically may refer, without limitation, to a method involving at least one computer and/or at least one computer network. The computer and/or computer network may comprise at least one processor which is configured for performing at least one of the method steps of the method according to the present disclosure. Typically, each of the method steps is performed by the computer and/or computer network. The method may be performed completely automatically, specifically without user interaction. The term "automatically" as used herein is a broad term and is to be given its ordinary and customary meaning to a person of ordinary skill in the art and is not to be limited to a special or customized meaning. The term specifically may refer, without limitation, to a process which is performed completely by means of at least one computer and/or computer network and/or machine, in particular without manual action and/or interaction with a user.

The term "mass spectrometry" as used herein is a broad term and is to be given its ordinary and customary meaning to a person of ordinary skill in the art and is not to be limited to a special or customized meaning. The term specifically may refer, without limitation, to an analytical technique for determining a mass-to-charge ratio of ions. The mass spectrometry may be performed using at least one mass spectrometry device. As used herein, the term "mass spectrometry device", also denoted "mass analyzer", is a broad term and is to be given its ordinary and customary meaning to a person of ordinary skill in the art and is not to be limited to a special or customized meaning. The term specifically may refer, without limitation, to an analyzer configured for detecting at least one analyte based on the mass-to-charge ratio. The mass analyzer may be or may comprise at least one quadrupole analyzer. As used herein, the term "quadrupole mass analyzer" is a broad term and is to be given its ordinary and customary meaning to a person of ordinary skill in the art and is not to be limited to a special or customized meaning. The term specifically may refer, without limitation, to a mass analyzer comprising at least one quadrupole as mass filter. The quadrupole mass analyzer may comprise a plurality of quadrupoles. For example, the quadrupole mass analyzer may be a triple quadrupole mass spectrometer. As used herein, the term "mass filter" is a broad term and is to be given its ordinary and customary meaning to a person of ordinary skill in the art and is not to be limited to a special or customized meaning. The term specifically may refer, without limitation, to a device configured for selecting ions injected to the mass filter according to their mass-to-charge ratio m/z. The mass filter may comprise two pairs of electrodes. The electrodes may be rod-shaped, in particular cylindrical. In ideal case, the electrodes may be hyperbolic. The electrodes may be designed identical. The electrodes may be arranged in parallel extending along a common axis, e.g., a z axis. The quadrupole mass analyzer may comprise at least one power supply circuitry configured for applying at least one direct current (DC) voltage and at least one alternating current (AC) voltage between the two pairs of electrodes of the mass filter. The power supply circuitry may be configured for holding each opposing electrode pair at identical potential. The power supply circuitry may be configured for changing sign of charge of the electrode pairs periodically such that stable trajectories are only possible for ions within a certain mass-to-charge ratio m/z. Trajectories of ions within the mass filter can be described by the Mathieu differential equations. For measuring ions of different m/z values DC and AC voltage may be changed in time such that ions with different m/z values can be transmitted to a detector mass spectrometry device.

The mass spectrometry device may further comprise at least one ionization source. As used herein, the term "ionization source", also denoted as "ion source", is a broad term and is to be given its ordinary and customary meaning to a person of ordinary skill in the art and is not to be limited to a special or customized meaning. The term specifically may refer, without limitation, to a device configured for generating ions, e.g., from neutral gas molecules. The ionization source may be or may comprise at least one source selected from the group consisting of: at least one gas phase ionization source such as at least one electron impact (EI) source or at least one chemical ionization (CI) source; at least one desorption ionization source such as at least one plasma desorption (PDMS) source, at least one fast atom bombardment (FAB) source, at least one secondary ion mass spectrometry (SIMS) source, at least one laser desorption (LDMS) source, and at least one matrix assisted laser desorption (MALDI) source; at least one spray ionization source such as at least one thermospray (TSP) source, at least one atmospheric pressure chemical ionization (APCI) source, at least one electrospray (ESI), and at least one atmospheric pressure ionization (API) source.

The mass spectrometry device may comprise at least one detector. As used herein, the term "detector", is a broad term and is to be given its ordinary and customary meaning to a person of ordinary skill in the art and is not to be limited to a special or customized meaning. The term specifically may refer, without limitation, to an apparatus configured for detecting incoming ions. The detector may be configured for detecting charged particles. The detector may be or may comprise at least one electron multiplier.

The mass spectrometry device, in particular the detector and/or at least one evaluation device of the mass spectrometry device, may be configured to determining at least one mass spectrum of the detected ions. As used herein, the term "mass spectrum" is a broad term and is to be given its ordinary and customary meaning to a person of ordinary skill in the art and is not to be limited to a special or customized meaning. The term specifically may refer, without limitation, to a two dimensional representation of signal intensity vs the charge-to-mass ratio m/z, wherein the signal intensity corresponds to abundance of the respective ion. The mass spectrum may be a pixelated image. For determining resulting intensities of pixels of the mass spectrum, signals detected with the detector within a certain m/z range may be integrated. The analyte in the sample may be identified by the at least one evaluation device. Specifically, the evaluation device may be configured for correlating known masses to the identified masses or through a characteristic fragmentation pattern.

The mass spectrometry device may be or may comprise a liquid chromatography mass spectrometry device. The mass spectrometry device may be connected to and/or may comprise at least one liquid chromatograph. The liquid chromatograph may be used as sample preparation for the mass spectrometry device. Other embodiments of sample preparation may be possible, such as at least one gas chromatograph. As used herein, the term "liquid chromatography mass spectrometry device" is a broad term and is to be given its ordinary and customary meaning to a person of ordinary skill in the art and is not to be limited to a special or customized meaning. The term specifically may refer, without limitation, to a combination of liquid chromatography with mass spectrometry. The mass spectrometry device may comprise at least one liquid chromatograph. The liquid chromatography mass spectrometry device may be or may comprise at least one high performance liquid chromatography (HPLC) device or at least one micro liquid chromatography (μLC) device. The liquid chromatography mass spectrometry device may comprise a liquid chromatography (LC) device and a mass spectrometry (MS) device, in the present case the mass filter, wherein the LC device and the mass filter are coupled via at least one interface. The interface coupling the LC device and the MS device may comprise the ionization source configured for generating of molecular ions and for transferring of the molecular ions into the gas phase. The interface may further comprise at least one ion mobility module arranged between the ionization source and the mass filter. For example, the ion mobility module may be a high-field asymmetric waveform ion mobility spectrometry (FAIMS) module.

As used herein, the term "liquid chromatography (LC) device" is a broad term and is to be given its ordinary and customary meaning to a person of ordinary skill in the art and is not to be limited to a special or customized meaning. The term specifically may refer, without limitation, to an analytical module configured to separate one or more analytes of interest of a sample from other components of the sample for detection of the one or more analytes with the mass spectrometry device. The LC device may comprise at least one LC column. For example, the LC device may be a single-column LC device or a multi-column LC device having a plurality of LC columns. The LC column may have a stationary phase through which a mobile phase is pumped in order to separate and/or elute and/or transfer the analytes of interest. The liquid chromatography mass spectrometry device may further comprise a sample preparation station for the automated pre-treatment and preparation of samples each comprising at least one analyte of interest.

As used herein, the term "sample" is a broad term and is to be given its ordinary and customary meaning to a person of ordinary skill in the art and is not to be limited to a special or customized meaning. The term specifically may refer, without limitation, to an arbitrary test sample such as a biological sample and/or an internal standard sample. The sample may comprise one or more analytes of interest. For example, the test sample may be selected from the group consisting of: a physiological fluid, including blood, serum, plasma, saliva, ocular lens fluid, cerebral spinal fluid, sweat, urine, milk, ascites fluid, mucous, synovial fluid, peritoneal fluid, amniotic fluid, tissue, cells or the like. The sample may be used directly as obtained from the respective source or may be subject of a pretreatment and/or sample preparation workflow. For example, the sample may be pretreated by adding an internal standard and/or by being diluted with another solution and/or by having being mixed with reagents or the like. For example, analytes of interest may be vitamin D, drugs of abuse, therapeutic drugs, hormones, and metabolites in general. The internal standard sample may be a sample comprising at least one internal standard substance with a known concentration. For further details with respect to the sample, reference is made, e.g., to EP 3 425 369 A1, the full disclosure is included herewith by reference. Other analytes of interest are possible.

The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method comprises the following steps:
a) providing at least one mass spectrometry response curve by using at least one mass spectrometry device;
b) evaluating the mass spectrometry response curve by using at least one trained model thereby identifying a start point and an end point of at least one peak of the mass spectrometry response curve, wherein the model was trained using a deep learning regression architecture.

The term "mass spectrometry response curve" as used herein is a broad term and is to be given its ordinary and customary meaning to a person of ordinary skill in the art and is not to be limited to a special or customized meaning. The term specifically may refer, without limitation, to a one dimensional representation of the signal intensity. The mass spectrometry response curve has only one dimension. Specifically, the term "one dimension" may refer to the time axis and that the time is the only one independent variable. Accordingly, the term "one dimension" as used herein may refer to the fact that the only independent variable in the data is "time", the dependent variable being "intensity". Notably, the present disclosure may not require two independent variables (e.g., "time" and "mass to charge ratio") as is the case for some mass spectrometry data processing techniques. Usually, and in contrast to using only a one dimensional representation as proposed according to the present disclosure, convolutional neural networks are used for two-dimensional data and application such as for image recognition, in which two independent variables are present (x- and y-direction of the image). The term "providing" as used herein is a broad term and is to be given its ordinary and customary meaning to a person of ordinary skill in the art and is not to be limited to a special or customized meaning. The term specifically may refer, without limitation, to a process of determining and/or generating and/or making available the mass spectrometry response curve, in particular by performing at least one measurement with the mass spectrometry device. Accordingly, the term "providing at least one mass spectrometry response curve by using at least one mass spectrometry device" as used herein is a broad term and is to be given its ordinary and customary meaning to a person of ordinary skill in the art and is not to be limited to a special or customized meaning. The term specifically may refer, without limitation, to retrieving, on particular receiving, data of a mass spectrometry response curve obtained from the mass spectrometry device and/or performing at least one measurement with the mass spectrometry device thereby determining data of a mass spectrometry response curve which can be used for further evaluation in step b).

The term "evaluating the mass spectrometry response curve" as used herein is a broad term and is to be given its ordinary and customary meaning to a person of ordinary skill in the art and is not to be limited to a special or customized meaning. The term specifically may refer, without limitation, to analysis of the mass spectrometry response curve. The evaluation may comprises identifying of at least one peak and/or determining start and end point of the peak and/or determining a peak area of the peak. The evaluation may comprise applying at least one filter and/or using background reduction technique and/or using at least one fitting routing or the like. The evaluating may be performed using the at least one evaluation device as will be described in more detail below.

The term "peak" of the mass spectrometry response curve as used herein is a broad term and is to be given its ordinary and customary meaning to a person of ordinary skill in the art and is not to be limited to a special or customized meaning. The term specifically may refer, without limitation, to at least one local maximum of the mass spectrometry response curve.

The term "start point" of the peak as used herein is a broad term and is to be given its ordinary and customary meaning to a person of ordinary skill in the art and is not to be limited to a special or customized meaning. The term specifically may refer, without limitation, to a lower peak boundary. The start point may be a point of the time axis which defines the lower peak boundary. After the start point the mass spectrometry response curve raises to the local maximum. The start point may be the point, where the peak integration starts. The term "end point" of the mass spectrometry response curve as used herein is a broad term and is to be given its ordinary and customary meaning to a person of ordinary skill in the art and is not to be limited to a special or customized meaning. The term specifically may refer, without limitation, to an upper peak boundary. The end point may be a point of the time axis which defines the upper peak boundary. The mass spectrometry response curve falls before reaching the noise and/or background level at the end point. The end point may be the point, where the peak integration ends. Start point and end point may be points on the time axis which were identified as limits of the peak. The values of the start point and end point for a training dataset, which will be described in more detail below, may be determined by manual assessment by a trained user. The trained model may provide start point and end points for the further data. The peak area typically may be defined as integral of the response curve between start point and end point.

The term "identifying of the peak" as used herein is a broad term and is to be given its ordinary and customary meaning to a person of ordinary skill in the art and is not to be limited to a special or customized meaning. The term specifically may refer, without limitation, to a qualitative determination of the peak such as presence or absence and/or a quantitative determination of the peak such as determining a peak area of the peak. The determining of the peak area may comprise a peak integration, in particular by using at least one mathematical operation and/or mathematical algorithm for determining a peak area enclosed by a peak of the mass spectrometry response curve. Specifically, the integration of the peak may comprise identification and/or measurement of curve characteristics of the mass spectrometry response curve. The peak identification comprises determining start point and/or end point. The peak identification may further comprise one or more of peak detection, peak finding, peak fitting, peak evaluation, determining of background, and determining of basis line. The peak integration may allow determining of one or more of peak area, retention time, peak height, and peak width. The peak identification may be an automatic peak identification, i.e., peak identification performed by at least one computer and/or computer network and/or machine. Specifically, the automatic peak identification may be performed without manual action or interaction with a user.

The term "trained model" as used herein is a broad term and is to be given its ordinary and customary meaning to a person of ordinary skill in the art and is not to be limited to a special or customized meaning. The term specifically may refer, without limitation, to a model for identifying a peak in the mass spectrometry response curve which was trained on at least one training dataset, also denoted training data. In particular, the trained model was trained on existing data that has a priori been classified by experts. This allows to provide an automated peak identification with enhanced reliability and less susceptibility to variance and errors. The trained model may comprise an architecture and a set of weights for the various filters or nodes defined by the architecture. The architecture of the CNN may reflect the complex relationship between the shape of the response curve and the position of start point and end point of the peaks.

The method may comprise at least one training step, wherein, in the training step, the trained model is trained on the at least one training dataset. The training step may be an offline training, whereas the peak identification in step b) of the proposed method may be an online peak identification. Specifically, the training step may be performed before performing steps a) and b). The term "online" as used herein is a broad term and is to be given its ordinary and customary meaning to a person of ordinary skill in the art and is not to be limited to a special or customized meaning. The term specifically may refer, without limitation, to during measurement process with the mass spectrometry device.

The model was trained using a deep learning regression architecture. The term "deep learning" as used herein is a broad term and is to be given its ordinary and customary meaning to a person of ordinary skill in the art and is not to be limited to a special or customized meaning. The term specifically may refer, without limitation, to at least one method relating to machine learning. The deep learning may be based on at least one artificial neural network. The term "deep learning regression architecture" as used herein is a broad term and is to be given its ordinary and customary meaning to a person of ordinary skill in the art and is not to be limited to a special or customized meaning. The term specifically may refer, without limitation, to a deep learning architecture configured for solving regression problems.

The deep learning regression architecture may comprise a convolutional neural network. The convolutional neural network may be a multilayer convolutional neural network. The convolutional neural network may comprise a plurality of convolutional layers. The convolutional layers are one dimensional layers, i.e., the convolution is applied to the one-dimensional time domain. Generally, convolutional layers are a standard basic building block in convolutional neural networks and as such are known to the skilled person. Mathematically, convolutional layers correspond to the operation of convoluting the input data with a convolutional kernel (see e.g., en.wikipedia.org/wiki/Convolutional_neural_network). The term "convolutional layer" as used herein is a broad term and is to be given its ordinary and customary meaning to a person of ordinary skill in the art and is not to be limited to a special or customized meaning. The term specifically may refer, without limitation, to an operation of convoluting the input data with a 1-dimensional convolutional kernel. The convolutional layers may be followed by a plurality of fully-connected layers. The convolutional neural network may comprise a plurality of pooling layers. The structure of convolutional neural networks is generally known to the skilled person such as from en.wikipedia.org/wiki/Convolutional_neural_network#Convolutional. Using convolutional neural networks for object recognition in images is generally known to the skilled person. However, the present disclosure proposes a novel approach using convolutional neural networks for 1D signal analysis.

The convolutional neural network (CNN) may be configured for solving regression problems. For solving regression problems, the convolutional neural network may comprise as final layer a regression layer, in particular in contrast to the usual classification softmax layer. The regression layer may be a fully connected layer. The regression layer may have a linear or sigmoid activation. Thus, the present disclosure proposes using one-dimensional convolutional neural networks in a regression framework. Specifically, the present disclosure proposes using the convolutional neural network to fit a complex function that maps inputs to peak locations. The convolutional neural network, however, may not be used for classifying 1D signals into categories.

The training step may comprise the following substeps:
i) providing at least one training dataset comprising a plurality of input mass spectrometry response curves and corresponding ground truth;
ii) determining the at least one model by using the deep learning regression architecture on the training dataset, wherein the determination of the model comprising determining a model architecture and at least one parameter of the model.

Step i) may comprise providing more than 100, typically more than 1000, of input mass spectrometry response curves. For example, the model may be trained using 1270 Vitamin D3 curves. The plurality of input mass spectrometry response curves provided in step i) may be determined by performing a plurality of measurements using the mass spectrometry device. For example, the plurality of input mass spectrometry response curves provided in step i) may be or may comprise LC-MS data from a particular analyte, such as from Vitamin D2 or from Vitamin D3. The term "ground truth" as used herein is a broad term and is to be given its ordinary and customary meaning to a person of ordinary skill in the art and is not to be limited to a special or customized meaning. The term specifically may refer, without limitation, to real or true values of start point and end point of the peak of the corresponding input mass spectrometry response curve. The ground truth may indicate the location of the peak. For example, the ground truth may be a peak location or location of the peak start and end point. The ground truth may be provided by trained LC-MS operators.

An injection to the mass spectrometry device may result in four mass spectrometry response curves, i.e., two analyte mass spectrometry response curves and two internal standard mass spectrometry response curves. The training dataset may be provided as five channel vector comprising an aggregated time vector, two analyte mass spectrometry response curves and two internal standard mass spectrometry response curves. The raw time vectors of the four response curves comprise time steps which deviate at least slightly from curve to curve. The term "aggregated time vector" may refer to a time vector for which all four response curves are interpolated on the same time grid. The training data set may be provided as input, also denoted input data, to the convolutional neural network. For example, given an input mass spectrometry response curve with length N, the input may be a 2×N matrix, wherein the first row represents the N intensity values, such as the y values of a chromatogram, and the second row may represent the N time values, such as the x values of the chromatogram. The aggregation may allow the convolutional neural network to propagate information among the different mass spectrometry response curves such that, for example, if a peak is particularly weak on a given analyte curve, the peak locations of the other curves can be used to inform on the location of the weak curve.

The training of the model may comprise at least one normalization step. The normalization step may comprise normalizing the input data with respect to time. The normalization step may comprise translating the time values such that the expected retention time may be at t=0. The normalization step may comprise cropping the input data to a fixed time window around the expected retention time. The normalization step may comprise normalizing the intensity values Y themselves by:

$$Y_{norm} = \frac{Y}{\|Y\|}.$$

The training of the model may comprise at least one augmentation step. To achieve generalization across analytes, the convolutional neural network may be trained with augmented data accounting for shift and scaling differences in the mass spectrometry response curve data. The augmentation step may allow to avoid overtraining. The augmentation step may comprise a position augmentation and/or a scale augmentation. The position augmentation may comprise shifting the peak location by a pre-defined constant value. The position augmentation may comprise using a sliding window. This may allow to account for the potential for peaks to widen and narrow. The scaling augmentation may comprise scaling the peak by a pre-defined value, such as by 1.2. For each input mass spectrometry response curve the training dataset may be supplemented by randomly generating thee new datasets using position augmentation and three new datasets using scale augmentation.

The method may comprise using the deep learning regression architecture on the normalized and/or augmented training dataset together with the ground truth.

The deep learning regression architecture may be a convolutional neural network (CNN) build by the Keras library in Python with TensorFlow as the backend. For Keras library in Python with TensorFlow reference is made to https://www.tensorflow.org/, https://de.wikipedia.org/wiki/TensorFlow, and https://keras.io/ or https://de.wikipedia.org/wiki/Keras. For example, the following setting may be used: As optimizer an adaptive moment estimation (Adam) may be used. The loss function may be the mean-squared error. The number of epochs may be 500, batch size 16 and early stopping with patience may be 100.

The training step further may comprise at least one testing step using at least one test dataset. The testing step may comprise a validation of the trained model. The term "test dataset" as used herein is a broad term and is to be given its ordinary and customary meaning to a person of ordinary skill in the art and is not to be limited to a special or customized meaning. The term specifically may refer, without limitation, to at least one mass spectrometry response curve and corresponding ground truth which was not included into the training dataset. The testing step may comprise determining start point and an end point of at least one peak of the mass spectrometry response curve of the test dataset using the determined model. Performance of the determined model may be determined based on the determined start point and an end point and a ground truth of the mass spectrometry response curve of the test dataset.

The method may comprises determining, in particular automatically, a peak area of the peak of the mass spectrometry response curve provided in step i) by using the identified start point and end point.

In a further aspect of the present disclosure, a computer program or identifying at least one peak in a mass spectrometry response curve is disclosed, the computer program comprising instructions which, when the program is executed cause a computer or computer network to fully or partially carry out steps a) and b) of the method according to the present disclosure, such as according to any one of the embodiments disclosed above and/or according to any one of the embodiments disclosed in further detail below. Step a) may comprise steps which may be performed at least partially by a user such as a step of sample preparation. However, embodiments are possible wherein all steps of the method according to the present disclosure are performed fully automatic. Thus, specifically, one, more than one or even all of method steps a) and b) as indicated above may be performed by using a computer or a computer network, typically by using a computer program. Specifically, the computer program may be stored on a computer-readable data carrier and/or on a computer-readable storage medium.

Similarly, a computer-readable storage medium is disclosed, comprising instructions which, when executed, cause a computer or computer network fully or partially carry out steps a) and b) of the method according to the present disclosure, such as according to any one of the embodiments disclosed above and/or according to any one of the embodiments disclosed in further detail below.

As used herein, the term "computer-readable storage medium" specifically may refer to a non-transitory data storage means, such as a hardware storage medium having stored there—on computer-executable instructions. The computer-readable data carrier or storage medium specifically may be or may comprise a storage medium such as a random-access memory (RAM) and/or a read-only memory (ROM).

The computer program may also be embodied as a computer program product. As used herein, a computer program product may refer to the program as a tradable product. The product may generally exist in an arbitrary format, such as in a paper format, or on a computer-readable data carrier and/or on a computer-readable storage medium. Specifically, the computer program product may be distributed over a data network.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:
- a computer or computer network comprising at least one processor, wherein the processor is adapted to perform the method according to one of the embodiments described in this description,
- a computer loadable data structure that is adapted to perform the method according to one of the embodiments described in this description while the data structure is being executed on a computer,
- a computer program, wherein the computer program is adapted to perform the method according to one of the embodiments described in this description while the program is being executed on a computer,
- a computer program comprising program means for performing the method according to one of the embodiments described in this description while the computer program is being executed on a computer or on a computer network,
- a computer program comprising program means according to the preceding embodiment, wherein the program means are stored on a storage medium readable to a computer,
- a storage medium, wherein a data structure is stored on the storage medium and wherein the data structure is adapted to perform the method according to one of the embodiments described in this description after having been loaded into a main and/or working storage of a computer or of a computer network, and
- a computer program product having program code means, wherein the program code means can be stored or are stored on a storage medium, for performing the method according to one of the embodiments described in this description, if the program code means are executed on a computer or on a computer network.

In a further aspect of the present disclosure, a device for monitoring at least one analyte in a sample is disclosed. The device comprises:
- at least one mass spectrometry device configured for providing at least one mass spectrometry response curve;
- at least one evaluation device configured for evaluating the mass spectrometry response curve by using at least one trained model thereby identifying a start point and an end point of at least one peak of the mass spectrometry response curve, wherein the model was trained using a deep learning regression architecture.

The device may be configured for performing the method for identifying at least one peak in a mass spectrometry response curve according to any one of the preceding embodiments referring to a method. For definitions of the features of the device and for optional features of the device, reference may be made to one or more of the embodiments of the method as disclosed above or as disclosed in further detail below.

The term "evaluation device" as generally used herein is a broad term and is to be given its ordinary and customary meaning to a person of ordinary skill in the art and is not to be limited to a special or customized meaning. The term specifically may refer, without limitation, to an arbitrary device configured for executing the named operations. The evaluation device may comprise at least one processing unit. The processing unit may be an arbitrary logic circuitry configured for performing basic operations of a computer or system, and/or, generally, to a device which is configured for performing calculations or logic operations. In particular, the processing unit may be configured for processing basic instructions that drive the computer or system. As an example, the processing unit may comprise at least one arithmetic logic unit (ALU), at least one floating-point unit (FPU), such as a math co-processor or a numeric coprocessor, a plurality of registers, specifically registers configured for supplying operands to the ALU and storing results of operations, and a memory, such as an L1 and L2 cache memory. In particular, the processing unit may be a multi-core processor. Specifically, the processing unit may be or may comprise a central processing unit (CPU). Additionally or alternatively, the processing unit may be or may comprise a microprocessor, thus specifically the processing unit's elements may be contained in one single integrated circuitry (IC) chip. Additionally or alternatively, the processing unit may be or may comprise one or more application-specific integrated circuits (ASICs) and/or one or more field-programmable gate arrays (FPGAs) or the like. The processing unit specifically may be configured, such as by software programming, for performing one or more evaluation operations.

The evaluation device may be configured for performing the step b) of the method according to the present disclosure as described in detail above or in more detail below. The evaluation device may further be configured for performing the training steps described in detail above or in more detail below.

Summarizing and without excluding further possible embodiments, the following embodiments may be envisaged:

Embodiment 1: A computer implemented method for identifying at least one peak in a mass spectrometry response curve, the method comprising the following steps:
a) Providing at least one mass spectrometry response curve by using at least one mass spectrometry device;
b) Evaluating the mass spectrometry response curve by using at least one trained model thereby identifying a start point and an end point of at least one peak of the mass spectrometry response curve, wherein the model was trained using a deep learning regression architecture.

Embodiment 2: The method according to the preceding embodiment, wherein the deep learning regression architecture comprises a convolutional neural network.

Embodiment 3: The method according to the preceding embodiment, wherein the convolutional neural network is a multilayer convolutional neural network.

Embodiment 4: The method according to the preceding embodiment, wherein the convolutional neural network comprises a plurality of convolutional layers, wherein the convolutional layers are one dimensional layers.

Embodiment 5: The method according to anyone of the two preceding embodiments, wherein the convolutional neural network comprises as final layer a regression layer, wherein the regression layer has a linear or sigmoid activation.

Embodiment 6: The method according to any one of the three preceding embodiments, wherein the convolutional neural network comprises a plurality of pooling layers.

Embodiment 7: The method according to any one of the preceding embodiments, wherein the method comprises at least one training step, wherein the training step comprises the following substeps:
i) providing at least one training dataset comprising a plurality of input mass spectrometry response curves and corresponding ground truth;
ii) determining the at least one model by using the deep learning regression architecture on the training dataset, wherein the determination of the model comprising determining a model architecture and at least one parameter of the model.

Embodiment 8: The method according to the preceding embodiment, wherein the training dataset is provided as five channel vector comprising an aggregated time vector, two analyte mass spectrometry response curves and two internal standard mass spectrometry response curves.

Embodiment 9: The method according to any one of the two preceding embodiments, wherein the training of the model comprises at least one normalization step and/or at least one augmentation step.

Embodiment 10: The method according to any one of the two preceding embodiments, wherein the training step further comprises at least one testing step using at least one test dataset, wherein the testing step comprises determining start point and an end point of at least one peak of the mass spectrometry response curve of the test dataset using the determined model, wherein performance of the determined model is determined based on the determined start point and an end point and a ground truth of the mass spectrometry response curve of the test dataset.

Embodiment 11: The method according to any one of the preceding embodiments, wherein the method comprises determining a peak area of the peak of the mass spectrometry response curve by using the identified start point and end point.

Embodiment 12: Computer program for identifying at least one peak in a mass spectrometry response curve, configured for causing a computer or computer network to fully or partially perform the method for identifying at least one peak in a mass spectrometry response curve according to any one of the preceding embodiments referring to a method, when executed on the computer or computer network, wherein the computer program is configured to perform at least step b) of the method for identifying at least one peak in a mass spectrometry response curve according to any one of the preceding embodiments referring to a method.

Embodiment 13: A computer program product having program code means, wherein the program code means can be stored or are stored on a storage medium, for performing at least step b) of the method for identifying at least one peak in a mass spectrometry response curve according to any one of the preceding embodiments referring to a method when the program code means are executed on a computer or on a computer network.

Embodiment 14: A device for monitoring at least one analyte in a sample comprising:
- at least one mass spectrometry device configured for providing at least one mass spectrometry response curve;
- at least one evaluation device configured for evaluating the mass spectrometry response curve by using at least one trained model thereby identifying a start point and an end point of at least one peak of the mass spectrometry response curve, wherein the model was trained using a deep learning regression architecture.

Embodiment 15: The device according to the preceding embodiment, wherein the device is configured for performing the method for identifying at least one peak in a mass spectrometry response curve according to any one of the preceding embodiments referring to a method.

In order that the embodiments of the present disclosure may be more readily understood, reference is made to the following examples, which are intended to illustrate the disclosure, but not limit the scope thereof.

Figure 1:
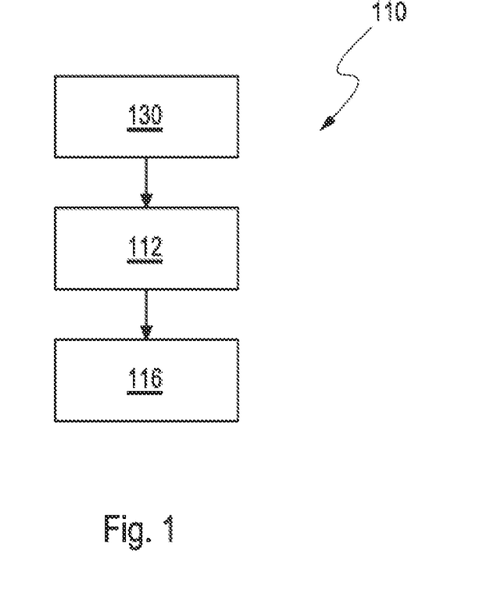
FIG. 1 shows an embodiment of the computer implemented method for identifying at least one peak in a mass spectrometry response curve according to the present disclosure.

FIG. 1 shows, highly schematically, a flowchart of an embodiment of the computer implemented method 110 for identifying at least one peak in a mass spectrometry response curve according to the present disclosure. The method may comprise the following steps:
- a) (denoted with reference number 112) providing at least one mass spectrometry response curve by using at least one mass spectrometry device 114;
- b) (denoted with reference number 116) evaluating the mass spectrometry response curve by using at least one trained model thereby identifying a start point and an end point of at least one peak of the mass spectrometry response curve, wherein the model was trained using a deep learning regression architecture 118.

Figure 2:
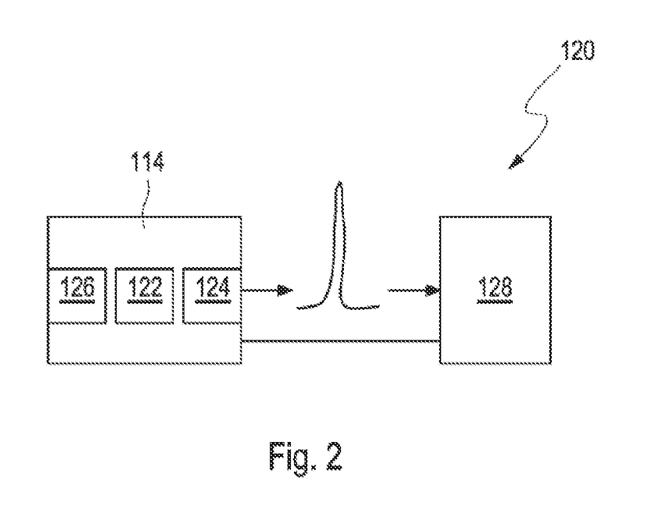
FIG. 2 shows an embodiment of a device for monitoring at least one analyte in a sample according to the present disclosure.

FIG. 2 shows an embodiment of a device 120 for monitoring at least one analyte in a sample according to the present disclosure comprising the mass spectrometry device 114. The mass spectrometry device 114 may be configured for detecting the at least one analyte based on a mass-to-charge ratio. The mass spectrometry device 114 may be or may comprise at least one quadrupole analyzer comprising at least one quadrupole 122 as mass filter. The quadrupole mass analyzer may comprise a plurality of quadrupoles. For example, the quadrupole mass analyzer may be a triple quadrupole mass spectrometer. The quadrupole mass analyzer may comprise at least one power supply circuitry, not shown here, configured for applying at least one direct current (DC) voltage and at least one alternating current (AC) voltage between two pairs of electrodes of the quadrupoles. The power supply circuitry may be configured for holding each opposing electrode pair at identical potential. The power supply circuitry may be configured for changing sign of charge of the electrode pairs periodically such that stable trajectories are only possible for ions within a certain mass-to-charge ratio m/z. Trajectories of ions within the mass filter can be described by the Mathieu differential equations. For measuring ions of different m/z values DC and AC voltage may be changed in time such that ions with different m/z values can be transmitted to a detector 124 of the mass spectrometry device 114.

The mass spectrometry device 114 may further comprise at least one ionization source 126. The ionization source 126 may be configured for generating ions, e.g., from neutral gas molecules. The ionization source 126 may be or may comprise at least one source selected from the group consisting of: at least one gas phase ionization source such as at least one electron impact (EI) source or at least one chemical ionization (CI) source; at least one desorption ionization source such as at least one plasma desorption (PDMS) source, at least one fast atom bombardment (FAB) source, at least one secondary ion mass spectrometry (SIMS) source, at least one laser desorption (LDMS) source, and at least one matrix assisted laser desorption (MALDI) source; at least one spray ionization source such as at least one thermospray (TSP) source, at least one atmospheric pressure chemical ionization (APCI) source, at least one electrospray (ESI), and at least one atmospheric pressure ionization (API) source.

The mass spectrometry device 114 may comprise the detector 124. The detector may be configured for detecting incoming ions. The detector 124 may be configured for detecting charged particles. The detector 124 may be or may comprise at least one electron multiplier.

The mass spectrometry device 114, in particular the detector 124 and/or at least one evaluation device 128 of the mass spectrometry device 114, may be configured to determining at least one mass spectrum of the detected ions. The mass spectrum may be a pixelated image. For determining resulting intensities of pixels of the mass spectrum, signals detected with the detector within a certain m/z range may be integrated. The analyte in the sample may be identified by the at least one evaluation device 128. Specifically, the evaluation device 128 may be configured for correlating known masses to the identified masses or through a characteristic fragmentation pattern. The mass spectrometry device 114 may be or may comprise a liquid chromatography mass spectrometry device. The mass spectrometry device 114 may be connected to and/or may comprise at least one liquid chromatograph. The liquid chromatograph may be used as sample preparation for the mass spectrometry device 114. Other embodiments of sample preparation may be possible, such as at least one gas chromatograph. The mass spectrometry device 114 may comprise at least one liquid chromatograph. The liquid chromatography mass spectrometry device may be or may comprise at least one high performance liquid chromatography (HPLC) device or at least one micro liquid chromatography (AC) device. The liquid chromatography mass spectrometry device may comprise a liquid chromatography (LC) device and a mass spectrometry (MS) device, in the present case the mass filter, wherein the LC device and the mass filter are coupled via at least one interface. The interface coupling the LC device and the MS device may comprise the ionization source configured for generating of molecular ions and for transferring of the molecular ions into the gas phase. The interface may further comprise at least one ion mobility module arranged between the ionization source and the mass filter. For example, the ion mobility module may be a high-field asymmetric waveform ion mobility spectrometry (FAIMS) module.

The LC device may be configured to separate one or more analytes of interest of a sample from other components of the sample for detection of the one or more analytes with the mass spectrometry device 114. The LC device may comprise at least one LC column. For example, the LC device may be a single-column LC device or a multi-column LC device having a plurality of LC columns. The LC column may have a stationary phase through which a mobile phase is pumped in order to separate and/or elute and/or transfer the analytes of interest. The liquid chromatography mass spectrometry device may further comprise a sample preparation station for the automated pre-treatment and preparation of samples each comprising at least one analyte of interest.

The sample may be an arbitrary test sample such as a biological sample and/or an internal standard sample. The sample may comprise one or more analytes of interest. For example, the test sample may be selected from the group consisting of: a physiological fluid, including blood, serum, plasma, saliva, ocular lens fluid, cerebral spinal fluid, sweat, urine, milk, ascites fluid, mucous, synovial fluid, peritoneal fluid, amniotic fluid, tissue, cells or the like. The sample may be used directly as obtained from the respective source or may be subject of a pretreatment and/or sample preparation workflow. For example, the sample may be pretreated by adding an internal standard and/or by being diluted with another solution and/or by having being mixed with reagents or the like. For example, analytes of interest may be vitamin D, drugs of abuse, therapeutic drugs, hormones, and metabolites in general. The internal standard sample may be a sample comprising at least one internal standard substance with a known concentration. For further details with respect to the sample, reference is made e.g., to EP 3 425 369 A1, the full disclosure is included herewith by reference. Other analytes of interest are possible.

The mass spectrometry response curve provided in step a) 112 may be a one dimensional representation of the signal intensity. The mass spectrometry response curve has only one dimension. The mass spectrometry response curve may be provided by determining and/or generating and/or making available the mass spectrometry response curve, in particular by performing at least one measurement with the mass spectrometry device 114.

The evaluating the mass spectrometry response curve in step b) 116 may comprise performing at least one analysis of the mass spectrometry response curve. The evaluation 116 may comprises identifying of at least one peak and/or determining start and end point of the peak and/or determining a peak area of the peak. The evaluation 116 may comprise applying at least one filter and/or using background reduction technique and/or using at least one fitting routing or the like.

The peak of the mass spectrometry response curve may be at least one local maximum of the mass spectrometry response curve. The start point of the peak may be a lower peak boundary. The start point may be a point of the time axis which defines the lower peak boundary. After the start point the mass spectrometry response curve raises to the local maximum. The start point may be the point, where the peak integration starts. The end point of the mass spectrometry response curve may be an upper peak boundary. The end point may be a point of the time axis which defines the upper peak boundary. The mass spectrometry response curve falls before reaching the noise and/or background level at the end point. The end point may be the point, where the peak integration ends. Start point and end point may be points on the time axis which were identified as limits of the peak. The values of the start point and end point for a training dataset, which will be described in more detail below, may be determined by manual assessment by a trained user. The trained model may provide start point and end points for the further data. The peak area typically may be defined as integral of the response curve between start point and end point.

Step b) 116 may comprise identifying of the peak. The identifying of the peak may comprise a qualitative determination of the peak such as presence or absence and/or a quantitative determination of the peak such as determining a peak area of the peak. The determining of the peak area may comprise a peak integration, in particular by using at least one mathematical operation and/or mathematical algorithm for determining a peak area enclosed by a peak of the mass spectrometry response curve. Specifically, the integration of the peak may comprise identification and/or measurement of curve characteristics of the mass spectrometry response curve. The peak identification comprises determining start point and/or end point. The peak identification may further comprise one or more of peak detection, peak finding, peak fitting, peak evaluation, determining of background, and determining of basis line. The peak integration may allow determining of one or more of peak area, retention time, peak height, and peak width. The peak identification may be an automatic peak identification, i.e., peak identification performed by at least one computer and/or computer network and/or machine. Specifically, the automatic peak identification may be performed without manual action or interaction with a user.

The trained model used in step b) 116 may be or may comprise a model for identifying a peak in the mass spectrometry response curve which was trained on at least one training dataset, also denoted training data. In particular, the trained model was trained on existing data that has a priori been classified by experts. This allows to provide an automated peak identification with enhanced reliability and less susceptibility to variance and errors. The trained model may comprise an architecture and a set of weights for the various filters or nodes defined by the architecture. The architecture of the CNN may reflect the complex relationship between the shape of the response curve and the position of start point and end point of the peaks.

The method 110 may comprise at least one training step 130, wherein, in the training step 130, the trained model is trained on the at least one training dataset. The training step 130 may be an offline training, whereas the peak identification in step b) 116 of the proposed method may be an online peak identification. Specifically, the training step 130 may be performed before performing steps a) 112 and b) 116.

The model was trained using the deep learning regression architecture 118. The deep learning regression architecture 118 may be a deep learning architecture configured for solving regression problems.

Figure 3:
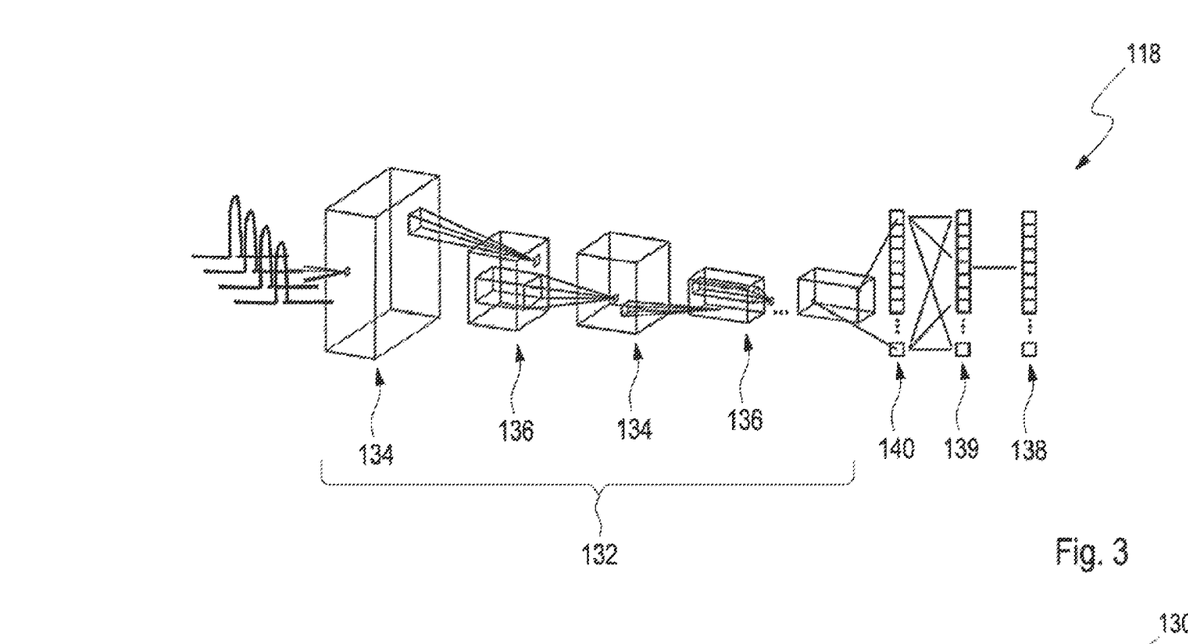
FIG. 3 shows an embodiment of a deep learning regression architecture.

The deep learning regression architecture 118 may comprise a convolutional neural network. The convolutional neural network may be a multilayer convolutional neural network. FIG. 3 shows an embodiment of the deep learning regression architecture 118. The convolutional neural network may comprise at least one feature learning part 132. The feature learning part may comprise a plurality of convolutional layers 134. The convolutional layers 134 are one dimensional layers, i.e., the convolution is applied to the one-dimensional time domain. The convolutional layers 134 each may comprise at least one Rectified Linear Unit, also denoted ReLU. The convolutional neural network 118 may comprise a plurality of pooling layers 136. The structure of convolutional neural networks is generally known to the skilled person such as from https://en.wikipedia.org/wiki/Convolutional_neural_network#Convolutional. Using convolutional neural networks for object recognition in images is generally known to the skilled person. However, the present disclosure proposes a novel approach using convolutional neural networks for 1D signal analysis.

The convolutional neural network 118 may be configured for solving regression problems. For solving regression problems, the convolutional neural network 118 may comprise as final layer a regression layer 138, in particular in contrast to the usual classification softmax layer. The convolutional neural network 118 may comprise at least one flattening layer 140.

The regression layer 138 may be a fully connected layer 139. The regression layer 138 may have a linear or sigmoid activation. Thus, the present disclosure proposes using one-dimensional convolutional neural networks in a regression framework. Specifically, the present disclosure proposes using the convolutional neural network 118 to fit a complex function that maps inputs to peak locations. The convolutional neural network 118, however, may not be used for classifying 1D signals into categories.

Figure 4:
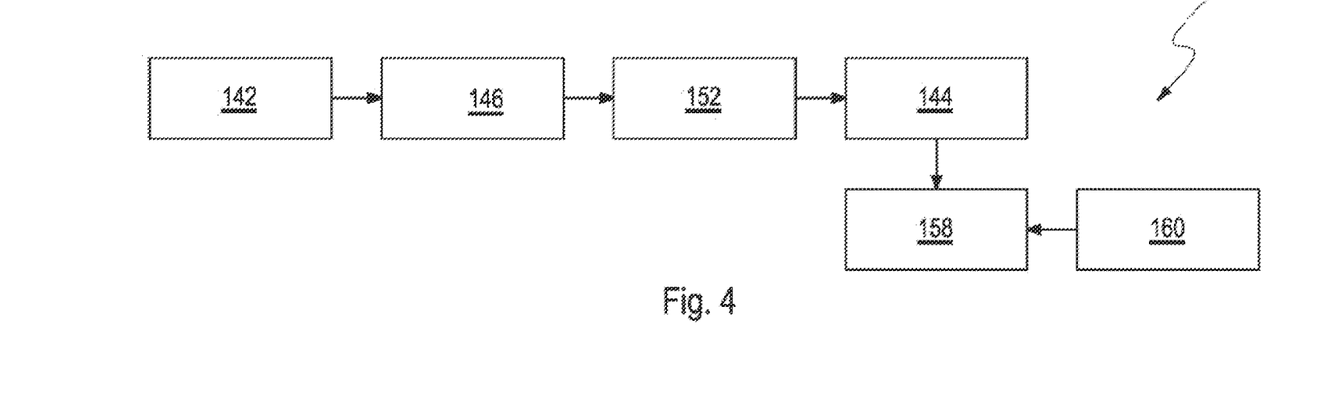
FIG. 4 shows an embodiment of a training step according to the present disclosure.

FIG. 4 shows an embodiment of a training step 130. The training step may comprise the following substeps:
i) (denoted with reference number 142) providing at least one training dataset comprising a plurality of input mass spectrometry response curves and corresponding ground truth;
ii) (denoted with reference number 144) determining the at least one model by using the deep learning regression architecture 118 on the training dataset, wherein the determination of the model comprising determining a model architecture and at least one parameter of the model.

Step i) 142 may comprise providing more than 100, typically more than 1000, of input mass spectrometry response curves. For example, the model may be trained using 1270 Vitamin D3 curves. The plurality of input mass spectrometry response curves provided in step i) 142 may be determined by performing a plurality of measurements using the mass spectrometry device. For example, the plurality of input mass spectrometry response curves provided in step i) 142 may be or may comprise LC-MS data from a particular analyte, such as from Vitamin D2 or from Vitamin D3. The ground truth may be a real or true value of start point and end point of the peak of the corresponding input mass spectrometry response curve. The ground truth may indicate the location of the peak. The ground truth may be provided by trained LC-MS operators.

An injection to the mass spectrometry device 114 may result in four mass spectrometry response curves, i.e., two analyte mass spectrometry response curves and two internal standard mass spectrometry response curves. The training dataset may be provided as five channel vector comprising an aggregated time vector, two analyte mass spectrometry response curves and two internal standard mass spectrometry response curves. The raw time vectors of the four response curves comprise time steps which deviate at least slightly from curve to curve. The aggregated time vector may be a time vector for which all four response curves are interpolated on the same time grid. The training data set may be provided as input, also denoted input data, to the convolutional neural network. For example, given an input mass spectrometry response curve with length N, the input may be a 2×N matrix, wherein the first row represents the N intensity values, such as the y values of a chromatogram, and the second row may represent the N time values, such as the x values of the chromatogram. The aggregation may allow the convolutional neural network to propagate information among the different mass spectrometry response curves such that, for example, if a peak is particularly weak on a given analyte curve, the peak locations of the other curves can be used to inform on the location of the weak curve.

The training 130 of the model may comprise at least one normalization step 146. The normalization step 146 may comprise normalizing the input data with respect to time. The normalization step 146 may comprise translating the time values such that the expected retention time may be at t=0, FIG. 5B. The normalization step 146 may comprise cropping the input data to a fixed time window around the expected retention time. The normalization step 146 may comprise normalizing the intensity values Y themselves by:

$$Y_{norm} = \frac{Y}{\|Y\|}.$$

Figure 5A:
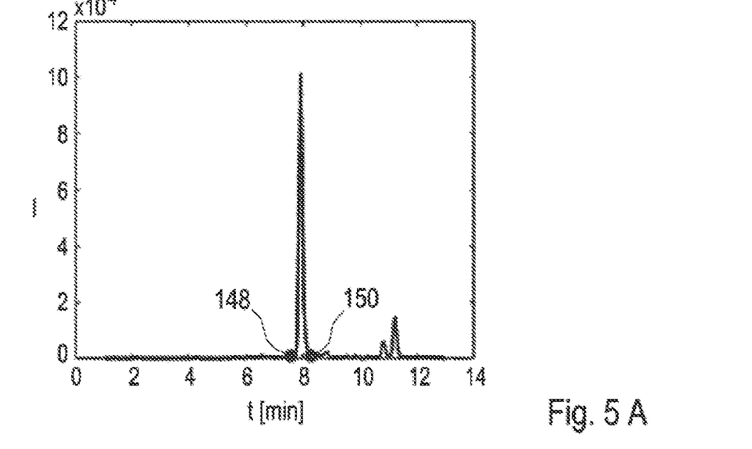
FIGS. 5A to 5C show an embodiment of normalization and cropping.
Figure 5B:
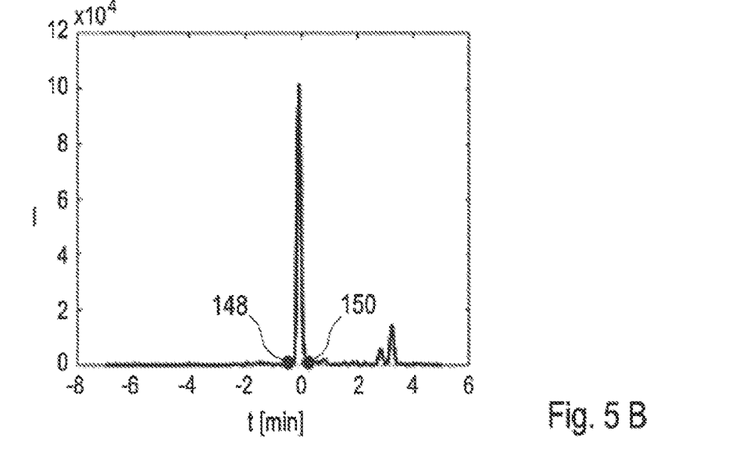
Figure 5C:
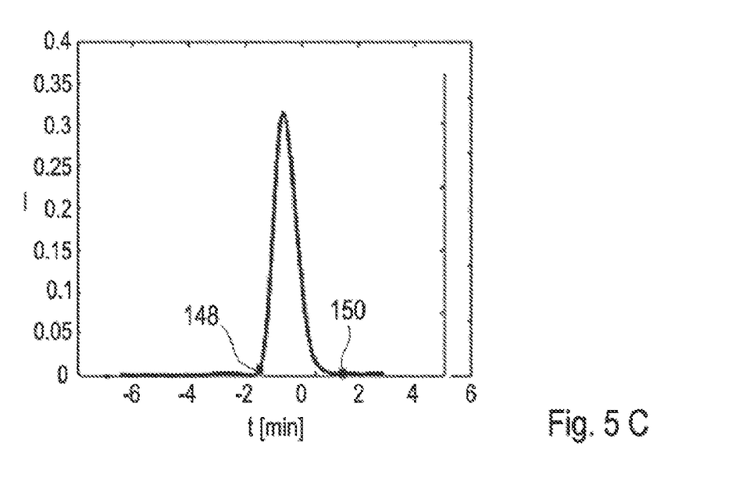

FIGS. 5A to 5C show an embodiment of normalization and cropping. FIG. 5A show intensity I as a function of time in minutes of the original input data. FIG. 5B shows the input data after normalization for time and FIG. 5C shows the input data after further normalization for intensity and cropping. The circle 148 dented the ground truth for peak start and circle 150 represent the ground truth of the peak end locations, respectively.

Figure 6:
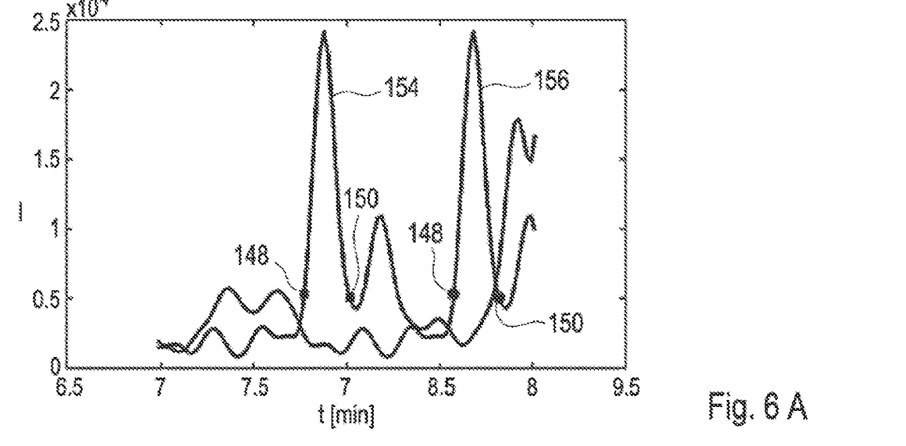
FIGS. 6A to 6C show embodiments of augmentation and scaling.

The training 130 of the model may comprise at least one augmentation step 152. To achieve generalization across analytes, the convolutional neural network may be trained with augmented data accounting for shift and scaling differences in the mass spectrometry response curve data. The augmentation step 152 may allow to avoid overtraining. The augmentation step 152 may comprise a position augmentation and/or a scale augmentation. The position augmentation may comprise shifting the peak location by a pre-defined constant value. The position augmentation may comprise using a sliding window. This may allow to account for the potential for peaks to widen and narrow. The scaling augmentation may comprise scaling the peak by a pre-defined value, such as by 1.2. For each input mass spectrometry response curve the training dataset may be supplemented by randomly generating thee new datasets using position augmentation and three new datasets using scale augmentation. FIG. 6B shows the original input data with ground truths 148 and 150. FIG. 6A illustrates the position augmentation, wherein the original curve 154 and the augmented curve 156 are depicted. FIG. 6C shows illustrates scale augmentation by 1.2.

The deep learning regression architecture 118 may be a convolutional neural network (CNN) build by the Keras library in Python with TensorFlow as the backend. For Keras library in Python with TensorFlow reference is made to https://www.tensorflow.org/, https://de.wikipedia.org/wiki/TensorFlow, and https://keras.io/ or https://de.wikipedia.org/wiki/Keras. For example, the following setting may be used: As optimizer an adaptive moment estimation (Adam) may be used. The loss function may be the mean-squared error. The number of epochs may be 500, batch size 16 and early stopping with patience may be 100.

The training step 130 may comprise using the deep learning regression architecture 118 on the normalized and/or augmented training dataset together with the ground truth. As an output 158 the model architecture and at least one parameter of the model may be provided.

The training step 130 further may comprise at least one testing step 160 using at least one test dataset. The testing step 160 may comprise a validation of the trained model. The test dataset may comprise at least one, typically a plurality of, mass spectrometry response curve and corresponding ground truth which was not included into the training dataset. The testing step 160 may comprise determining start point and an end point of at least one peak of the mass spectrometry response curve of the test dataset using the determined model. Performance of the determined model may be determined based on the determined start point and an end point and a ground truth of the mass spectrometry response curve of the test dataset.

In an experimental setup, the deep learning regression architecture 118 was trained 1462 curves, in particular fragment curves, of chromatograms from 488 unique samples. The chromatograms contained the ground truth. For the testing step 160, for final validation, 10% or 49 samples were reserved. For the testing step 160, for cross-validation, from the 488 samples, 439 samples were used to train the algorithm. For the cross-validation, the 439 samples were divided into 5 groups. 4 out of 5 are used for training 130, one for testing 160. This occurs with all possible permutations. It was found that the method 110 according to the present disclosure generalizes well across analytes and advancing the accuracy of LC-MS promising enhanced reliability of automatic peak identification.

The following table shows the performance ($R^2$ of peak locations) when the model is trained on a specific analyte and measurement system (denoted augmented data System2) and applied to another analyte and measurement system (denoted augmented data System1). It contains similar analytes, Vitamin D2 and Vitamin D3 and Testosterone, a totally different substance.

| Result | $R^2$ of peak locations |
|---|---|
| Training on augmented data System2 on Vitamin D3; Test on data System2 for Testosterone | 0.91 |
| Training on augmented data System2 on Vitamin D3. Test on data System 1 for Vitamin D3 | 0.95 |
| Training on augmented data System2 on Vitamin D3. Test on data System 1 for Vitamin D2 | 0.95 |

| List of reference numbers | |
|---|---|
| 110 | method |
| 112 | step a) |
| 114 | mass spectrometry device |
| 116 | step b) |
| 118 | deep learning regression architecture |
| 120 | device |
| 122 | quadrupole |
| 124 | detector |
| 126 | ionization source |
| 128 | evaluation device |
| 130 | training step |
| 132 | feature learning part |
| 134 | convolutional layer |
| 136 | pooling layer |
| 138 | regression layer |
| 139 | fully connected layer |
| 140 | flattening layer |
| 142 | step i) |
| 144 | step ii) |
| 146 | normalization step |
| 148 | circle |
| 150 | circle |
| 152 | augmentation step |
| 154 | original curve |
| 156 | augmented curve |
| 158 | output |
| 160 | testing step |

What is claimed is:

1. A computer implemented method for identifying at least one peak in a mass spectrometry response curve and monitoring at least one analyte in a sample, the method comprising the following steps:
   a) providing at least one mass spectrometry response curve by using at least one mass spectrometry device that includes a detector, a quadrupole mass analyzer, and an ionization source;
   b) evaluating the mass spectrometry response curve by using at least one trained model thereby identifying a start point and an end point of at least one peak of the mass spectrometry response curve, wherein the model is trained using a deep learning regression architecture, including i) providing at least one training dataset comprising a plurality of input mass spectrometry response curves and corresponding ground truth, and ii) determining the at least one model by using the deep learning regression architecture on the training dataset, wherein the determination of the model comprises determining a model architecture and at least one parameter of the model; and
   c) identifying, by an evaluation device, the analyte in the sample based on the evaluation of the mass spectrometry response curve, including performing correlation of defined masses to identified masses or identification of a characteristic fragmentation pattern.

2. The method according to claim 1, wherein the deep learning regression architecture comprises a convolutional neural network.

3. The method according to claim 2, wherein the convolutional neural network is a multilayer convolutional neural network.

4. The method according to claim 3, wherein the convolutional neural network comprises a plurality of convolutional layers, wherein the convolutional layers are one dimensional layers.

5. The method according to claim 2, wherein the convolutional neural network comprises as a final layer a regression layer, wherein the regression layer has a linear or sigmoid activation.

6. The method according to claim 1, wherein the training dataset is provided as a five channel vector comprising an aggregated time vector, two analyte mass spectrometry response curves and two internal standard mass spectrometry response curves.

7. The method according to claim 1, wherein the training of the model comprises at least one normalization step and/or at least one augmentation step.

8. The method according to claim 1, wherein the training step further comprises at least one testing step using at least one test dataset, wherein the testing step comprises determining a start point and an end point of at least one peak of the mass spectrometry response curve of the test dataset using the determined model, wherein performance of the determined model is determined based on the determined start point and an end point and a ground truth of the mass spectrometry response curve of the test dataset.

9. The method according to claim 1, wherein the method comprises determining a peak area of the peak of the mass spectrometry response curve by using the identified start point and end point.

10. A device for monitoring at least one analyte in a sample comprising:
    at least one mass spectrometry device that includes a detector, a quadrupole mass analyzer, and an ionization source, wherein the mass spectrometry device is configured for providing at least one mass spectrometry response curve;

at least one evaluation device configured for evaluating the mass spectrometry response curve by using at least one trained model thereby identifying a start point and an end point of at least one peak of the mass spectrometry response curve, wherein the model is trained using a deep learning regression architecture, including i) providing at least one training dataset comprising a plurality of input mass spectrometry response curves and corresponding ground truth, and ii) determining the at least one model by using the deep learning regression architecture on the training dataset, wherein the determination of the model comprises determining a model architecture and at least one parameter of the model, wherein the at least one evaluation device is further configured to identify the analyte in the sample based on the evaluation of the mass spectrometry response curve, including correlation of defined masses to identified masses or identification of a characteristic fragmentation pattern.

11. A non-transitory machine-readable storage media comprising instructions that, when executed, cause a computer to:

a) provide at least one mass spectrometry response curve by using at least one mass spectrometry device that includes a detector, a quadrupole mass analyzer, and an ionization source;
b) evaluate the mass spectrometry response curve by using at least one trained model thereby identifying a start point and an end point of at least one peak of the mass spectrometry response curve, wherein the model is trained using a deep learning regression architecture including i) providing at least one training dataset comprising a plurality of input mass spectrometry response curves and corresponding ground truth, and ii) determining the at least one model by using the deep learning regression architecture on the training dataset, wherein the determination of the model comprises determining a model architecture and at least one parameter of the model; and
c) identify the analyte in the sample based on the evaluation of the mass spectrometry response curve, including correlation of defined masses to identified masses or identification of a characteristic fragmentation pattern.

* * * * *